(12) United States Patent
Merth

(10) Patent No.: US 11,091,082 B2
(45) Date of Patent: Aug. 17, 2021

(54) HYDRAULIC HOSE REEL MANIFOLD FOR THE TRANSPORT INDUSTRY

(71) Applicant: Stac, Inc., St. Paul, MN (US)

(72) Inventor: Tyler Merth, Maplewood, MN (US)

(73) Assignee: Stac, Inc., St. Paul, MN (US)

( * ) Notice: Subject to any disclaimer, the term of this patent is extended or adjusted under 35 U.S.C. 154(b) by 236 days.

(21) Appl. No.: 16/432,210

(22) Filed: Jun. 5, 2019

(65) Prior Publication Data

US 2019/0375326 A1 Dec. 12, 2019

Related U.S. Application Data

(60) Provisional application No. 62/681,360, filed on Jun. 6, 2018.

(51) Int. Cl.
*B60P 3/22* (2006.01)
*B65H 75/44* (2006.01)
*B65H 75/42* (2006.01)

(52) U.S. Cl.
CPC .............. *B60P 3/22* (2013.01); *B60P 3/2265* (2013.01); *B65H 75/425* (2013.01); *B65H 75/4489* (2013.01); *B65H 2701/33* (2013.01)

(58) Field of Classification Search
CPC ...... B60P 3/22; B60P 3/2265; B65H 75/4489; B65H 75/425; B65H 2701/11
See application file for complete search history.

(56) References Cited

U.S. PATENT DOCUMENTS

| 4,576,337 | A | * | 3/1986 | Post | B65H 75/4489 |
| | | | | | 137/355.12 |
| RE34,488 | E | * | 12/1993 | Clark | B65H 54/2896 |
| | | | | | 242/386 |
| RE34,585 | E | * | 4/1994 | Schmidt, Jr. | B08B 9/043 |
| | | | | | 134/167 C |
| 6,732,791 | B2 | | 5/2004 | Buysse et al. | |
| 7,063,100 | B2 | | 6/2006 | Liberfarb | |

(Continued)

OTHER PUBLICATIONS

Hydraforce, "Two in One" Cartridge Valves, downloaded from www.hydraforce.com on Jun. 4, 2018.

(Continued)

*Primary Examiner* — Jessica Cahill
*Assistant Examiner* — Patrick C Williams
(74) *Attorney, Agent, or Firm* — Jeffrey D. Shewchuk; Shewchuk IP Services, LLC

(57) ABSTRACT

A manifold is part of the hydraulic system of a transport vehicle and controls both the product pump from the tank for unloading product and a hydraulically powered and controlled hose reel. The manifold includes a high pressure input port and a main return port tied into the hydraulic circuit on the vehicle, as well as two ports for the product pump and two ports for the hose reel. Control valves for both the product pump and the hose reel are mounted on and connected within the manifold block. The control valve for the hose reel preferably allows either forward (winding) or reverse (unwinding) of the hose reel under hydraulic power, as well as easy free spooling of the hose reel. A priority flow valve is also mounted on and connected within the manifold block, providing a higher flowrate to the product pump than to the hose reel motor.

19 Claims, 11 Drawing Sheets

(56) References Cited

U.S. PATENT DOCUMENTS

| | | | |
|---|---|---|---|
| 7,604,183 B1 * | 10/2009 | Hensley | A01C 23/047 |
| | | | 180/53.4 |
| 9,010,481 B2 | 4/2015 | Merth et al. | |
| 9,303,662 B2 | 4/2016 | Merth | |
| 2004/0007286 A1 * | 1/2004 | Kamikozuru | F17C 5/02 |
| | | | 141/231 |
| 2014/0257579 A1 * | 9/2014 | Darrow | B64F 1/28 |
| | | | 700/283 |
| 2018/0099837 A1 * | 4/2018 | Bambauer | B65H 75/4489 |
| 2018/0282109 A1 * | 10/2018 | Colleoni | H02G 11/02 |

OTHER PUBLICATIONS

Hydraforce, SV08-47B Spool, 4-Way, 3-Position, Open Center, downloaded from www.hydraforce.com on Jun. 4, 2018.
Hydraforce, SV12-21 Poppet, 2-Way, Normally Open, downloaded from www.hydraforce.com on Jun. 4, 2018.
Photo of portion of hydraulic system.

* cited by examiner

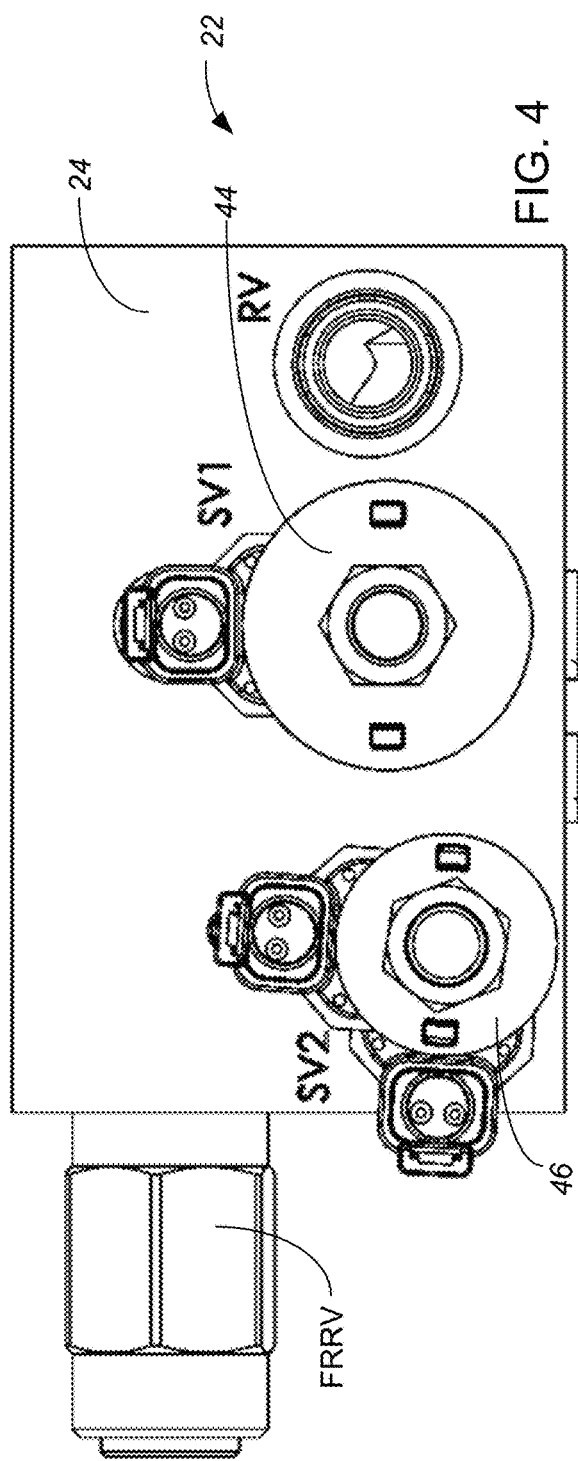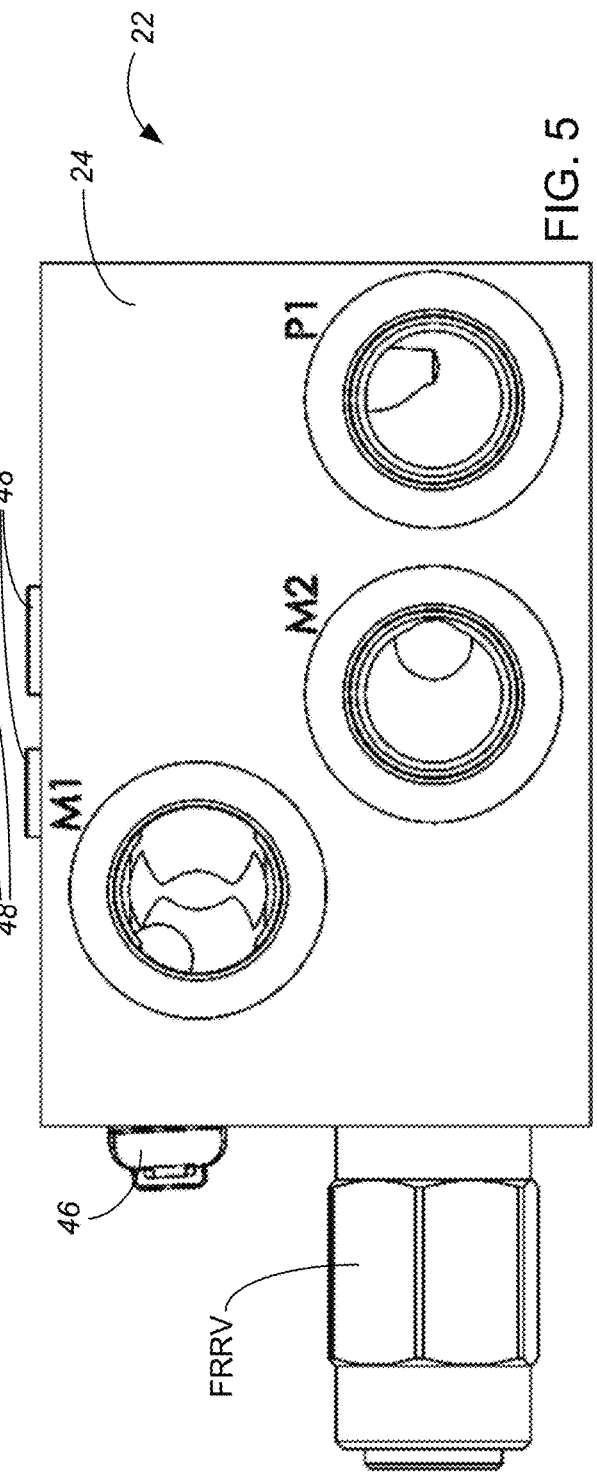

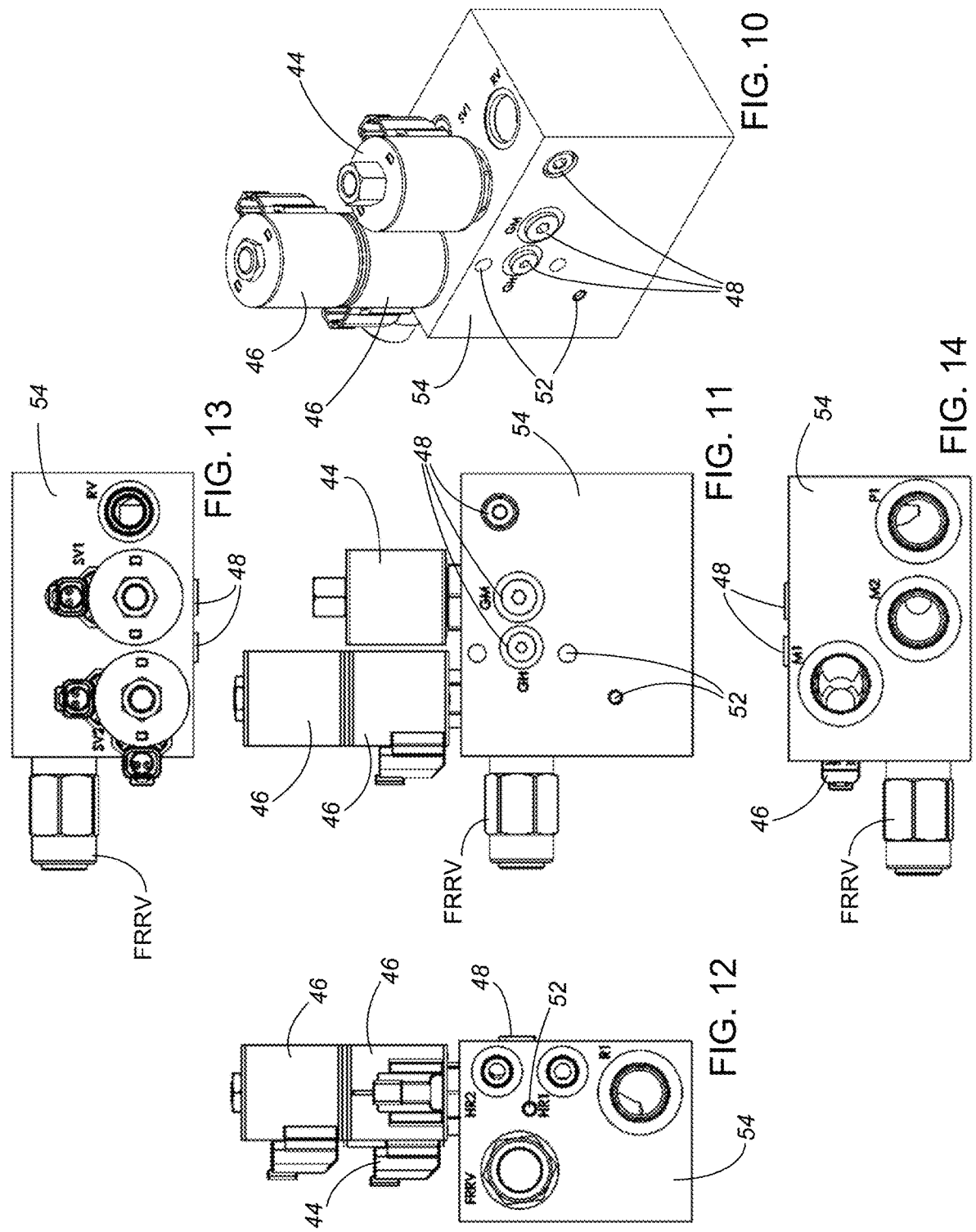

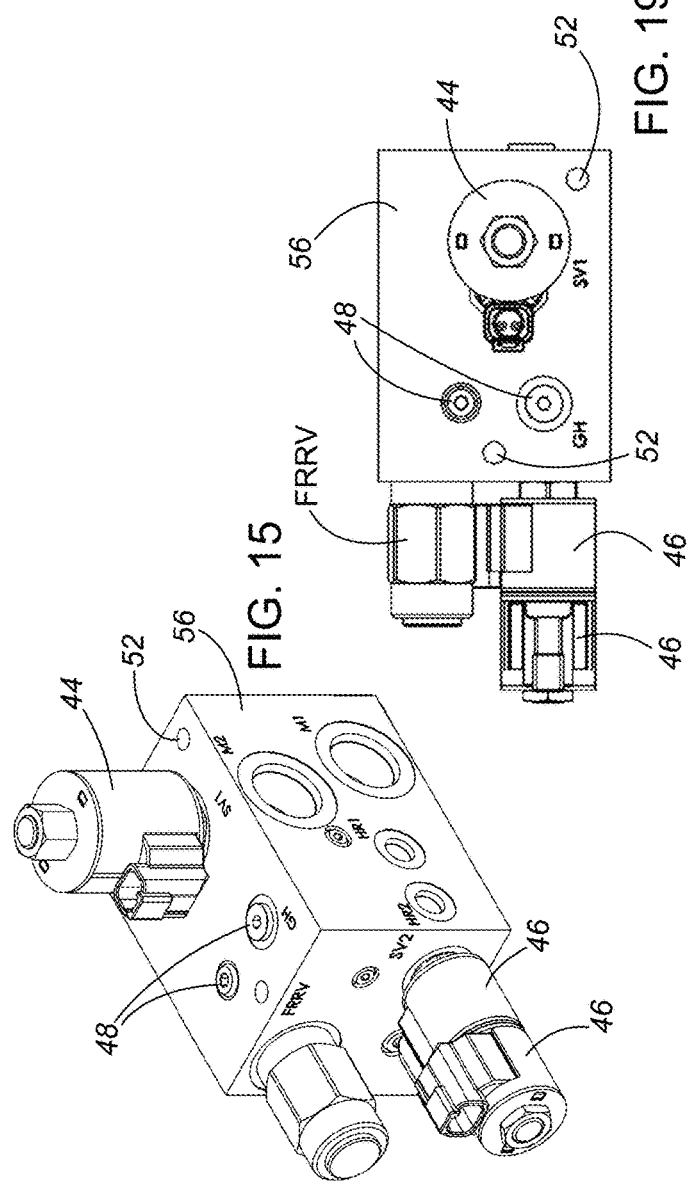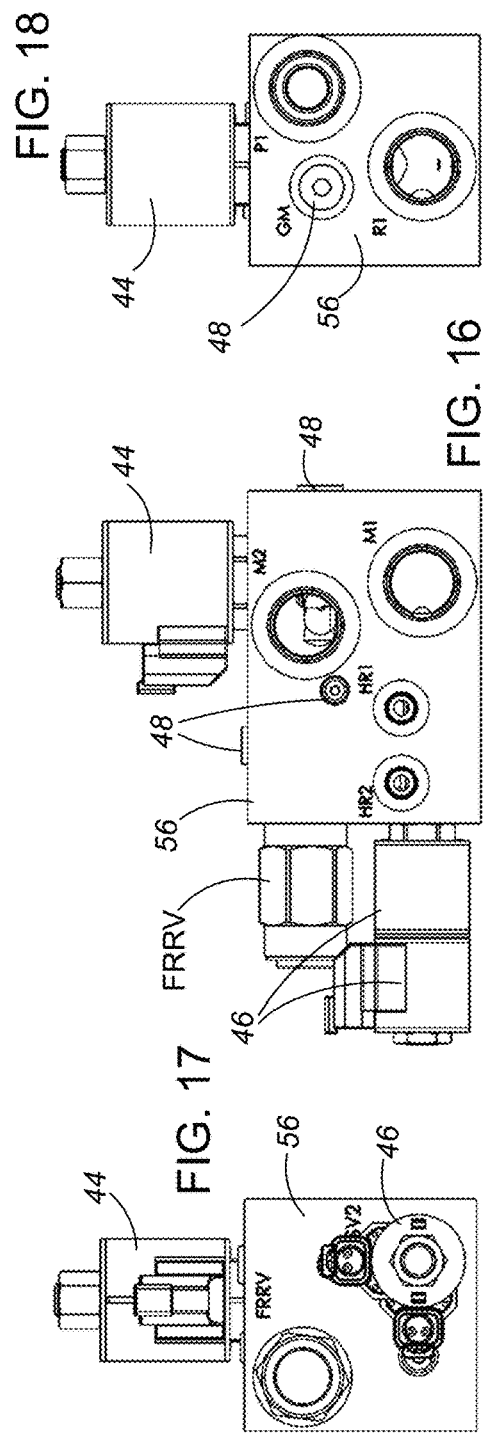

HYDRAULIC HOSE REEL MANIFOLD FOR THE TRANSPORT INDUSTRY

CROSS-REFERENCE TO RELATED APPLICATION(S)

The present application claims priority from U.S. Provisional Application No. 62/681,360 entitled HYDRAULIC HOSE REEL MANIFOLD FOR THE TRANSPORT INDUSTRY, filed Jun. 6, 2018, incorporated herein by reference.

BACKGROUND OF THE INVENTION

The present invention relates to vehicles which transport and dispense liquid from a tank through a reeled hose. Examples are shown and described in U.S. Pat. Nos. 6,732,791 and 9,010,481, both incorporated herein by reference and in entirety. For instance, in delivery of liquefied compresses gases such as propane, fuel oil and refined fuel, trucks known as "transports", "straight trucks" or "bobtails" are used, which include a product tank or "bottle". Depending on the type of truck, the tank or bottle can have a capacity from at least 500 to about 10,000 gallons of product, most typically about 2,600 to 3,000 gallons for bobtails.

The delivery/distribution of propane or other fuel is a significant portion of the product cost, and delivery of propane needs to be made as efficient as possible. Because both trucks and driver time are expensive, it is important to manage the fleet as efficiently as possible, and thereby deliver as much product as quickly as possible, with as few trucks as possible. As delivery schedules get tighter and tighter, delays or difficulty in delivering product not only significantly reduces profitability of the fleet, but also angers customers. At present, bobtail drivers can average 24 stops each shift, to deliver up to two full bottles or more—averaging about 4,800 gallons—per shift. One of the ways in which bobtail performance affects delivery times is in how long it takes to pump propane out of the bottle and into a customer's tank, often called a "pig". The pig may be located on the customer's property some distance from the pavement where the bobtail can be driven, and a hose on the bobtail is extended and connected between the bobtail and the pig. The hose is carried on the bobtail and is reeled up when not transporting product from the bobtail bottle to the pig.

The hose used in offloading product is typically large to lessen the pumping time, making the hose quite heavy for hand manipulation. For instance, one preferred hose is a 100 foot, 1 inch nominal inside diameter, Gates 20BHB delivery hose, though other sizes, such as 1¼ inch, 1½ inch, 2 inch or even 3 inch inside diameter hoses can be used. When delivering propane, the hose can weight from about 1 to 3 pounds per foot. Particularly when making numerous deliveries, including unwinding of the heavy product hose from its reel for connection to the pig, and then winding the product hose back up, mechanical assistance is beneficial. While the assistance can be via an electric motor, the present invention is particularly directed to product trucks having a hose reel which instead utilizes a directly coupled hydraulically powered motor for winding and/or unwinding of the product hose. Hydraulically powered hose reels are commercially available, for instance, from Hannay Reels Inc. of Westerlo, N.Y. Use of a hydraulically powered motor for the hose reel tends to avoid any chains or sprockets that are commonly present with electric motor driven hose reels, as such chains and/or sprockets have proven to be high maintenance items.

In general terms, the structures and systems which have been used to provide pressurized hydraulic fluid to a hydraulically powered hose reel have been ad hoc, custom installations. Better methods, structures and systems to provide pressurized hydraulic fluid to a hydraulically powered hose reel are needed.

SUMMARY OF THE INVENTION

The present invention is a structure, assembly, method and system which utilizes the hydraulic system of the transport vehicle to control both the product pump from the tank for unloading product and to provide a hydraulically powered and controlled hose reel. A single manifold includes a high pressure input port and a main return port tied into the hydraulic circuit on the vehicle, as well as two ports for the product pump and two ports for the hose reel. Control valves for both the product pump and the hose reel are mounted on and connected within the manifold block. The control valve for the hose reel preferably allows either forward (winding) or reverse (unwinding) of the hose reel under hydraulic power, as well as easy free spooling of the hose reel.

BRIEF DESCRIPTION OF THE DRAWINGS

FIG. 4 is a top plan view of the hydraulic manifold of FIGS. 1-3.

FIG. 5 is a bottom plan view of the hydraulic manifold of FIGS. 1-4.

FIG. 10 is a perspective (isometric) view of a first alternative hydraulic manifold of the present invention.

FIG. 11 is a front view of the hydraulic manifold of FIG. 10.

FIG. 12 is a left side view of the hydraulic manifold of FIGS. 10 and 11.

FIG. 13 is a top plan view of the hydraulic manifold of FIGS. 10-12.

FIG. 14 is a bottom plan view of the hydraulic manifold of FIGS. 10-13.

FIG. 15 is a perspective (isometric) view of a second alternative hydraulic manifold of the present invention.

FIG. 16 is a front view of the hydraulic manifold of FIG. 15.

FIG. 17 is a left side view of the hydraulic manifold of FIGS. 15 and 16.

FIG. 18 is a right side view of the hydraulic manifold of FIGS. 15-17.

FIG. 19 is a top plan view of the hydraulic manifold of FIGS. 15-18.

Figure 1:
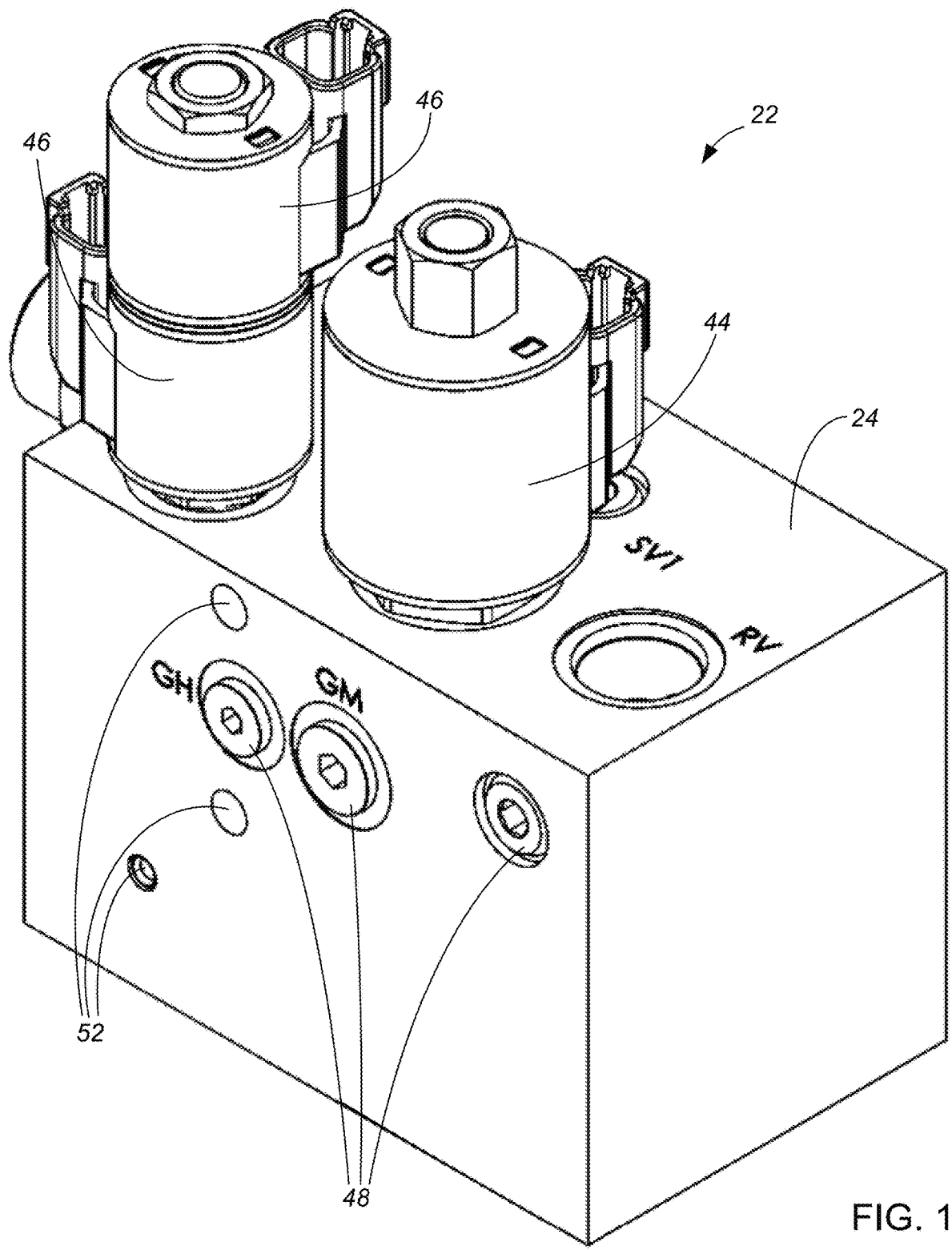
FIG. 1 is a perspective (isometric) view of a hydraulic manifold of a preferred embodiment of the present invention.
Figure 2:
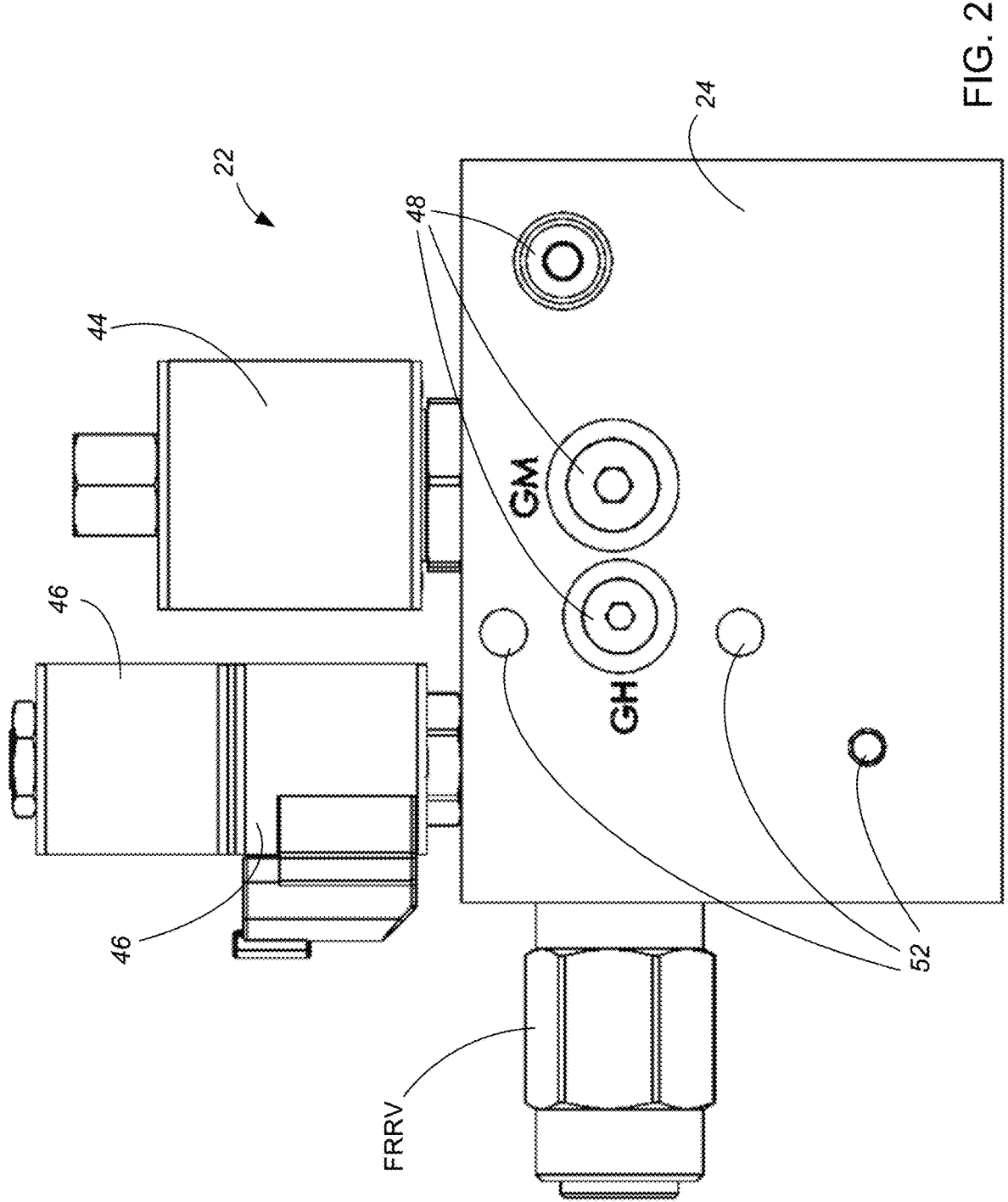
FIG. 2 is a front view of the hydraulic manifold of FIG. 1.
Figure 3:
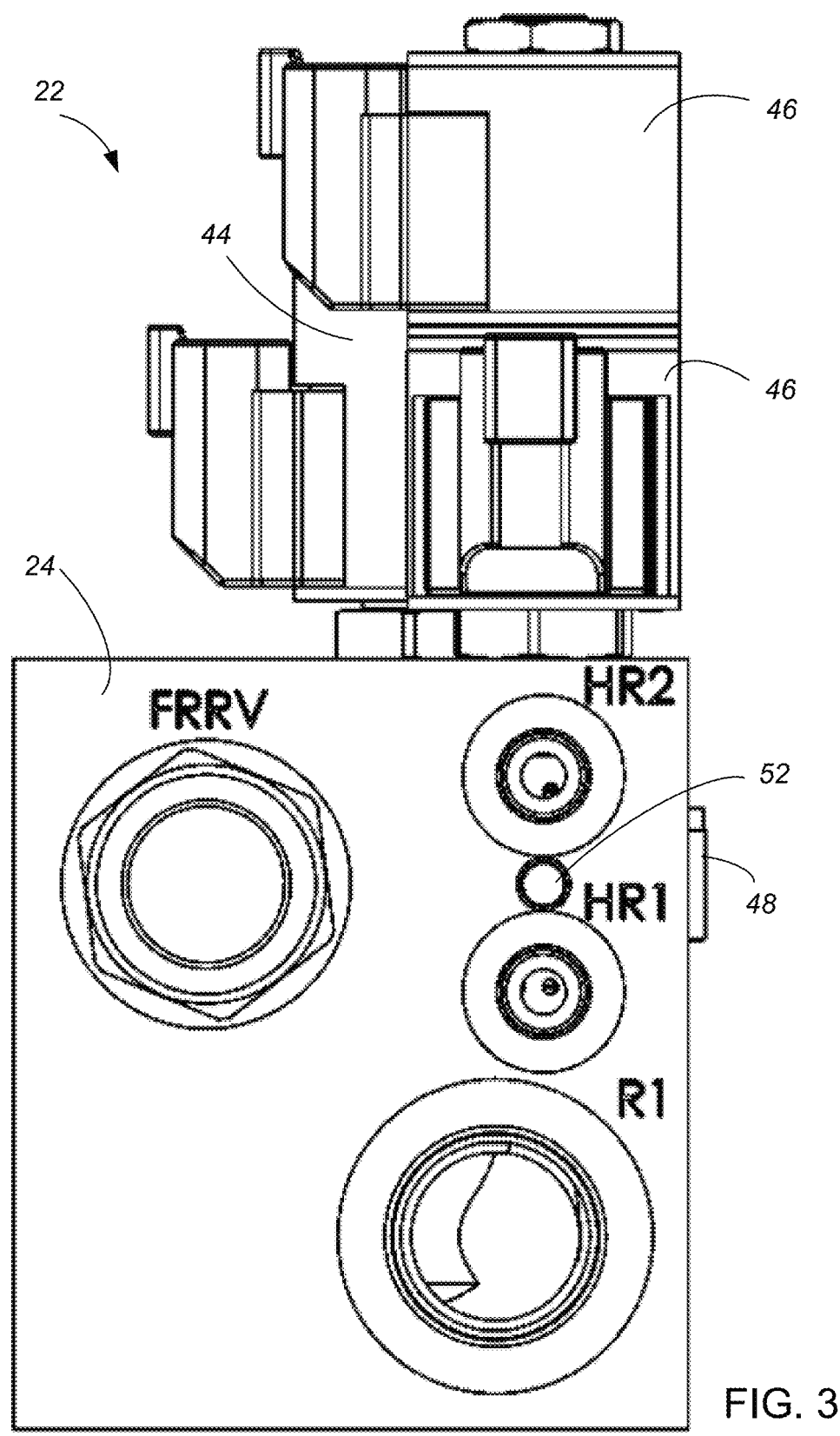
FIG. 3 is a left side view of the hydraulic manifold of FIGS. 1 and 2.
Figure 6:
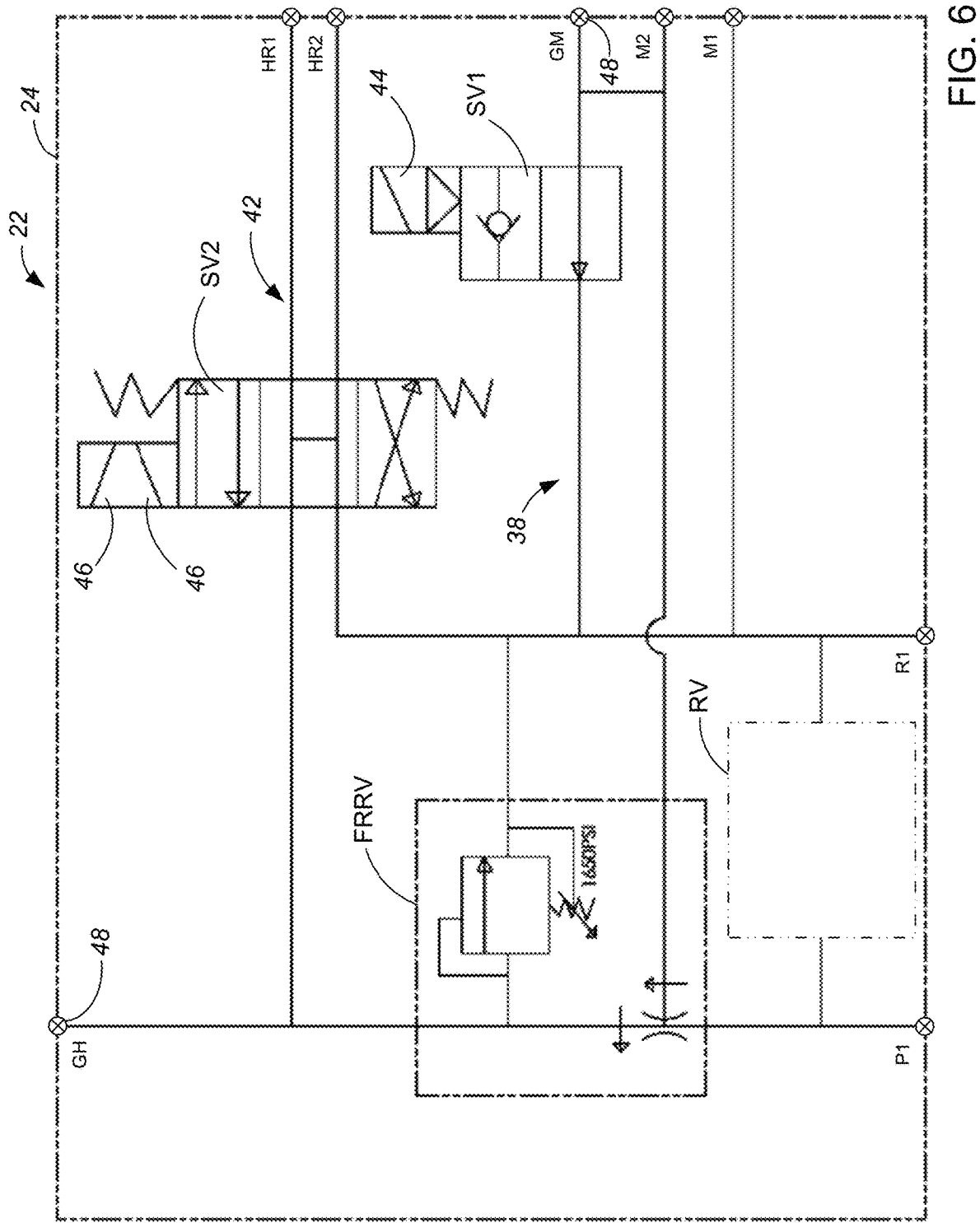
FIG. 6 is a hydraulic schematic for the preferred manifold of FIGS. 1-5.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention. The labels "rear", "right", "front", "left", "top" and "bottom" are merely for reference, as the orientation in which the hydraulic manifold is mounted is not significant to the operation of the invention.

DETAILED DESCRIPTION

The present invention utilizes the hydraulic system 10 of the transport vehicle 12 both to control the product pump 14 from the tank 16 for unloading product and to provide a hydraulically powered and controlled motor 18 for a hose reel 20. Thus, with reference to the preferred embodiment shown in FIGS. 1-7, the hydraulic system 10 includes a manifold 22 preferably based on a single manifold block 24. In the preferred embodiment, the manifold block 24 is machined out of 6061-T6 aluminum with a clear anodize finish, to provide a relatively lightweight and corrosion resistant construct 24 for rigid attachment of the relevant valves. Appropriate o-rings (not separately shown) can be used on all the ports, to create pressure tight seals of hydraulic fluid up to the operational pressures of the hydraulic system 10. The preferred manifold block 24 can be rectangular, having dimensions of about 5.5×4×3.5 inches, to provide space for fitting the various valves, ports and internal connections, while providing numerous mountable surfaces. Rectangular blocks of aluminum are readily available at relatively low cost for the manifold 22. Alternatively, particularly if higher volumes of manufacturing are to be achieved, the manifold block 24 could be custom formed or cast with a completely different shape, out of a different metal or even possibly a polymer starting material.

Figure 7:
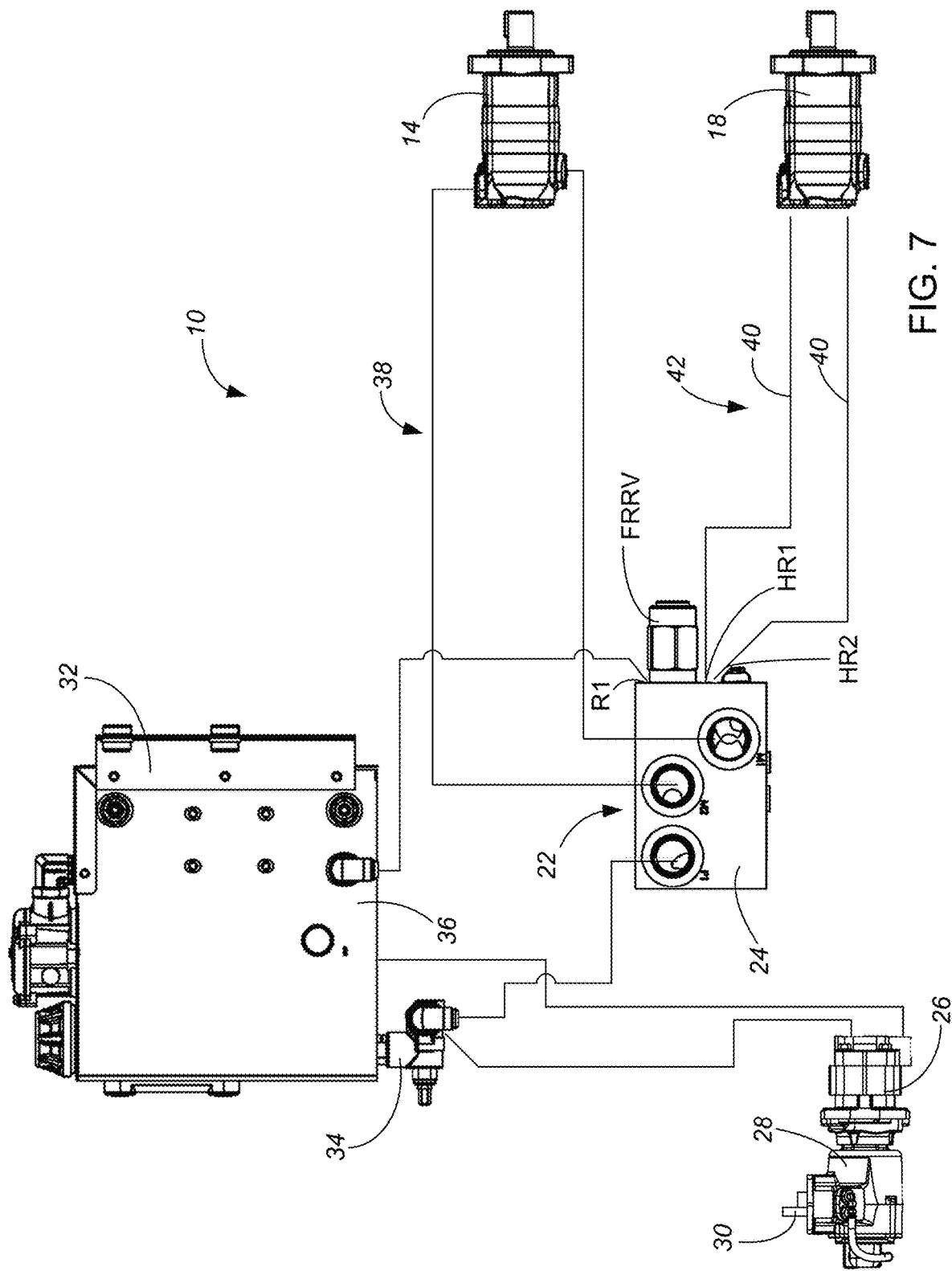
FIG. 7 is a largely schematic view of a preferred hydraulic system using the hydraulic manifold of FIGS. 1-6.

The block 24 includes an inlet, high pressure port P1, which receives high pressure hydraulic fluid from the main hydraulic pump 26 of the hydraulic system 10. As shown in FIG. 7, the hydraulic pump 26 is typically driven by the power take-off, or PTO 28, from the internal combustion engine/drive train 30 of the vehicle 12. The high pressure hydraulic fluid may traverse through a hydraulic cooler 32 such as taught in U.S. Pat. Nos. 6,732,791, 9,010,481 and 9,303,662, depicted in FIG. 7 through the main relief valve 34 of the hydraulic cooler 32. The block 24 also includes an outlet, return port R1 for returning hydraulic fluid toward the main hydraulic pump 26, in the preferred embodiment again through the reservoir 36 included as part of the hydraulic cooler 32. In the preferred embodiment, the high pressure inlet port P1 and the return port R1 are size 12T ports, intended to run at about 20 gpm.

The block 24 further includes one set of ports M1, M2 as the high pressure and return for connection to the product pump hydraulic motor 14 and another set of ports HR1, HR2 as the high pressure/return for connection to the hose reel hydraulic motor 18. The product pump ports M1, M2, which during operation will take a higher flow rate of hydraulic fluid, are preferably larger than the hose reel ports HR1, HR2. For instance, during operation the preferred embodiment directs about 18 gpm through the product pump 14 using the product pump ports M1, M2, which are appropriately sized such as preferably size 12T ports. Both the 12T ports of high pressure inlet port P1 and the return port R1 and the 12T product pump ports M1, M2 are 1 1/16 inches in diameter with a #12 thread.

The hose reel ports HR1, HR2, which during operation will take a lower flow rate of hydraulic fluid, preferably less than half of the hydraulic flow rate of the product pump hydraulic circuit 38 such as about 2 gpm, are preferably size 6T ports, though size 4T ports could also be used. The 6T ports are 9/16 inches in diameter with a #18 thread, while the 4T ports (if alternatively used) are 7/16 inches in diameter with a #20 thread.

With using the larger size 6T ports, the lines 40 from the manifold 22 to the hose reel motor 18 are 3/8 inch inner diameter lines rather than 1/4 inner diameter lines, even though being only intended to run 2 gpm during operation. One of the beneficial preferred features of the present invention is the ability to "free spool" the hose reel 20, i.e., to either wind or unwind the hose reel 20 by hand, overcoming any back pressure on the hose reel hydraulic motor 18 when the hose reel hydraulic motor 18 is not being hydraulically driven. By using larger lines 40 to the hose reel hydraulic motor 18, the free spooling pressure differential across the hose reel hydraulic motor 18 is decreased, making free spooling easier.

To split the high pressure flow between the high flowrate circuit 38 for the product pump hydraulic motor 14 and low flowrate hydraulic circuit 42 for the hose reel hydraulic motor 18, a priority flow valve FRRV is mounted on the manifold block 24. The preferred priority flow valve is a two-in-one cartridge valve which includes a pressure relief, such as taught in U.S. Pat. No. 7,063,100, incorporate by reference. The preferred priority flow valve is commecially available as a FRRV12-41F valve from Hydraforce, Inc. of Lincolnshire, Ill. The relative flowrates through the priority flow valve are preferably adjustable, in case different flowrates are called for by the product pump hydraulic motor 14 and the hose reel hydraulic motor 18 in any particular installation/bobtail vehicle 12.

In the preferred embodiment, the pressure relief is set at 1650 psi, though it could alternatively be set at a different value, such as at 1000 or 1200 psi. Setting the pressure relief at a higher value of over 1000 psi increases the pressure drop in the system 10 and results in additional heat generated within the hydraulic oil circuit 10 and particularly within the product pump 14 and oil cooler 32. The most preferred embodiment utilizes the hydraulic cooler and supplying vessel pressure stabilizer taught in U.S. Pat. No. 6,732,791, and the higher pressure relief value results in an increase in vapor pressure and corresponding increase in overall product stabilization during discharge.

A bypass solenoid valve SV1 is mounted on the manifold block 24 in the larger, product pump (e.g., 18 gpm) circuit 38. The bypass solenoid valve SV1 is used for controlling starting and stopping of the hydraulic motor in the product pump 14. The preferred solenoid valve SV1 is a normally open valve requiring an electrical charge to close it and no charge to open it. Because the bypass solenoid valve SV1 is directly between the product pump pressure port M2 and the return port R1, the product pump motor 14 is only driven when the solenoid 44 drives the bypass solenoid valve SV1 closed. The preferred bypass solenoid valve is a 2-way, poppet-type, screw-in hydraulic cartridge valve such as a SV12-21 valve available from Hydraforce.

A solenoid valve SV2 for the hose reel motor 18 is mounted on the manifold block 24 within the smaller flowrate, hose reel (e.g., 2 gpm) circuit 42. The hose reel solenoid valve SV1 is used for controlling starting and stopping and direction of rotation of the hydraulic motor 18 in the hose reel 20. The preferred solenoid valve SV2 is a four-way, three-position open center bidirectional spool valve, such as a SV08-47B (½ inch)(shown in FIGS. 1-5) or a SK10-47B (⅝ inch)(shown in FIGS. 10-14) screw-in hydraulic cartridge valve available from Hydraforce. When de-energized, the spool valve SV2 allows flow to all of the valve ports, such that in the neutral position the hydraulic fluid cycles to the reservoir 36 in the existing hydraulic system 10. One of the coils 46 is energized for driving the hose reel motor 18 forward for winding of the hose reel 20, and the other coil 46 is energized for driving the hose reel motor 18 in the opposite or reverse direction for unwinding of the hose reel 20. For both the product pump solenoid valve SV1 and the hose reel solenoid valve SV2, the preferred coils 44, 46 are appropriately sized (#10 or #8) 12 VDC electric coils such as round coils with Deutsch DT04-2P connectors also available from Hydraforce, Inc., with an appropriately sized coil spacer (not separately shown) between the two coils 46 used for the hose reel solenoid valve SV2. Using 12 VDC electric coils allows the coils 44, 46 to be energized off the 12 VDC electrical system in place on the vast majority of existing bobtails.

The most preferred manifold block 24 also includes two gauge ports, a first gauge port GM for reading the high pressure provided to the product pump 14 at M2, and a second gauge port GH for reading the high pressure line to the hose reel motor 18. In the preferred embodiment, the product pump gauge port GM is a size 6T port and the hose reel guage port GH is a size 4T port, both plugged with cavity plugs 48 during normal operational use of the system 10.

Figure 8:
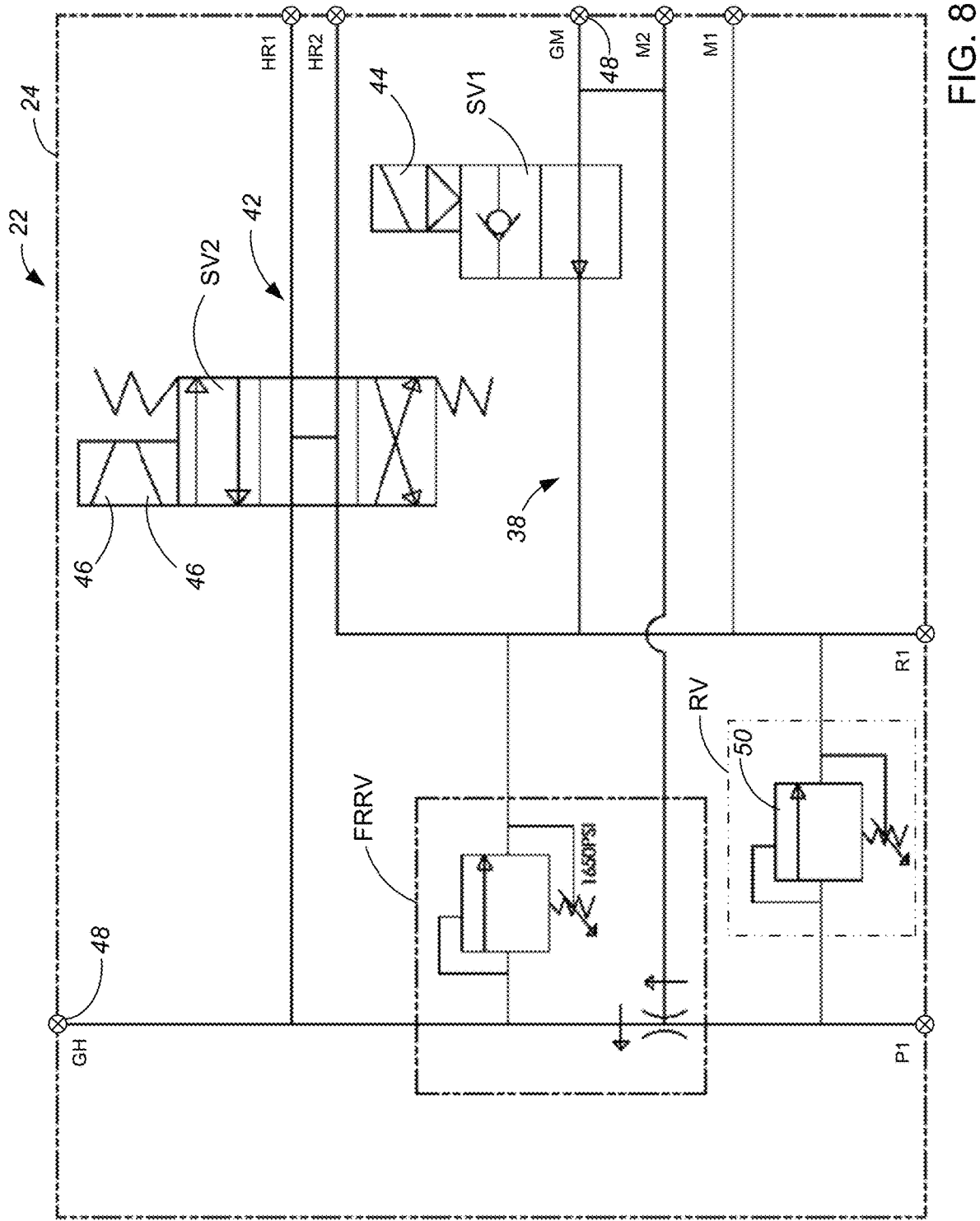
FIG. 8 is an alternative hydraulic schematic for the preferred manifolds, with an additional main pressure relief valve.

The preferred manifold block structure 24 includes another port RV, which is shown open in FIGS. 1-5. If desired, an additional main relief valve 50 can be added into the manifold block 24 using the port RV. The additional main relief valve 50 is included in the schematic of FIG. 8. Alternatively, the port RV can be closed with a cavity plug (not shown), particularly if the system 10 has a main relief valve 34 already as shown in FIG. 7.

Figure 9:
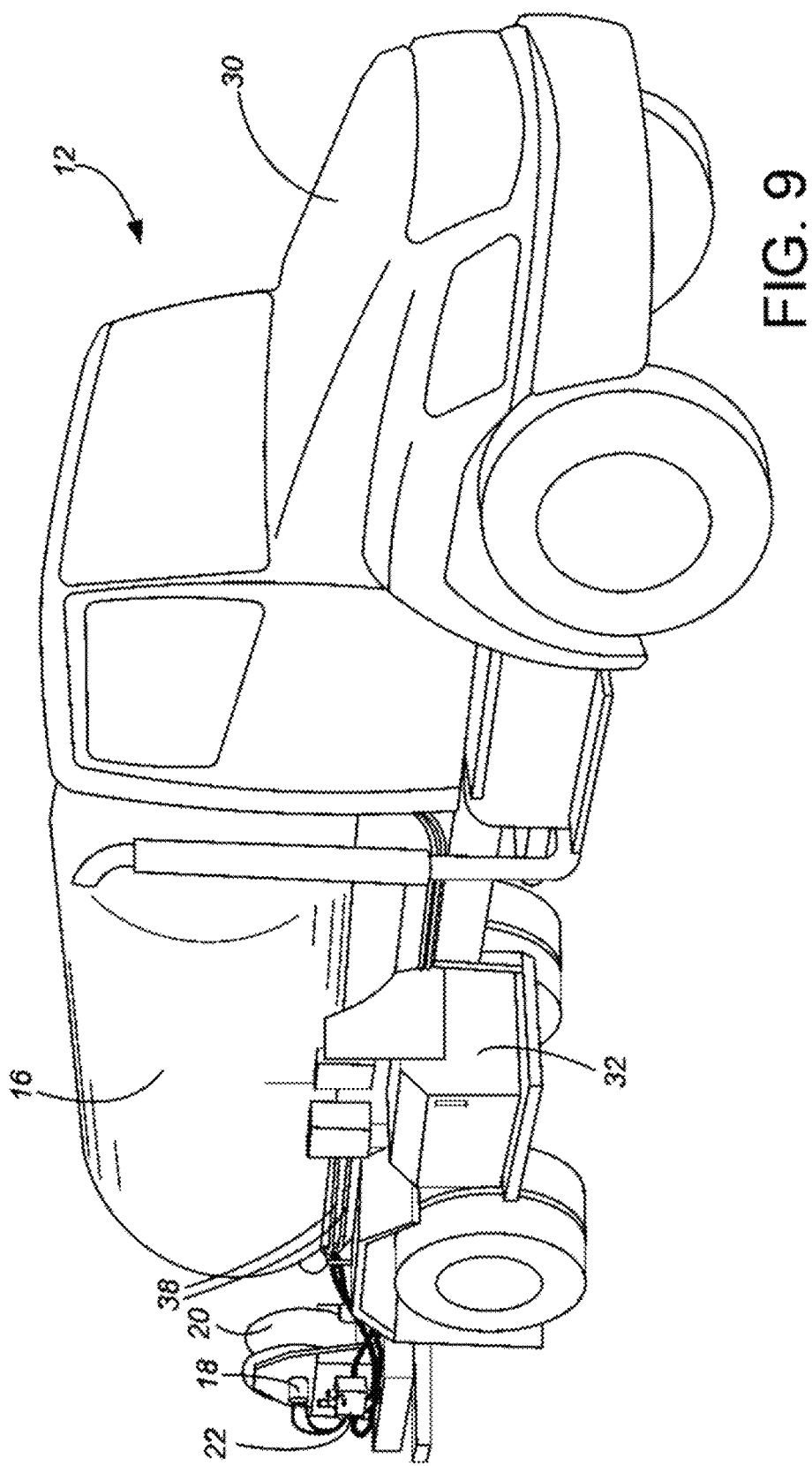
FIG. 9 is a perspective view of a bobtail incorporating the present invention.
Figure 20:
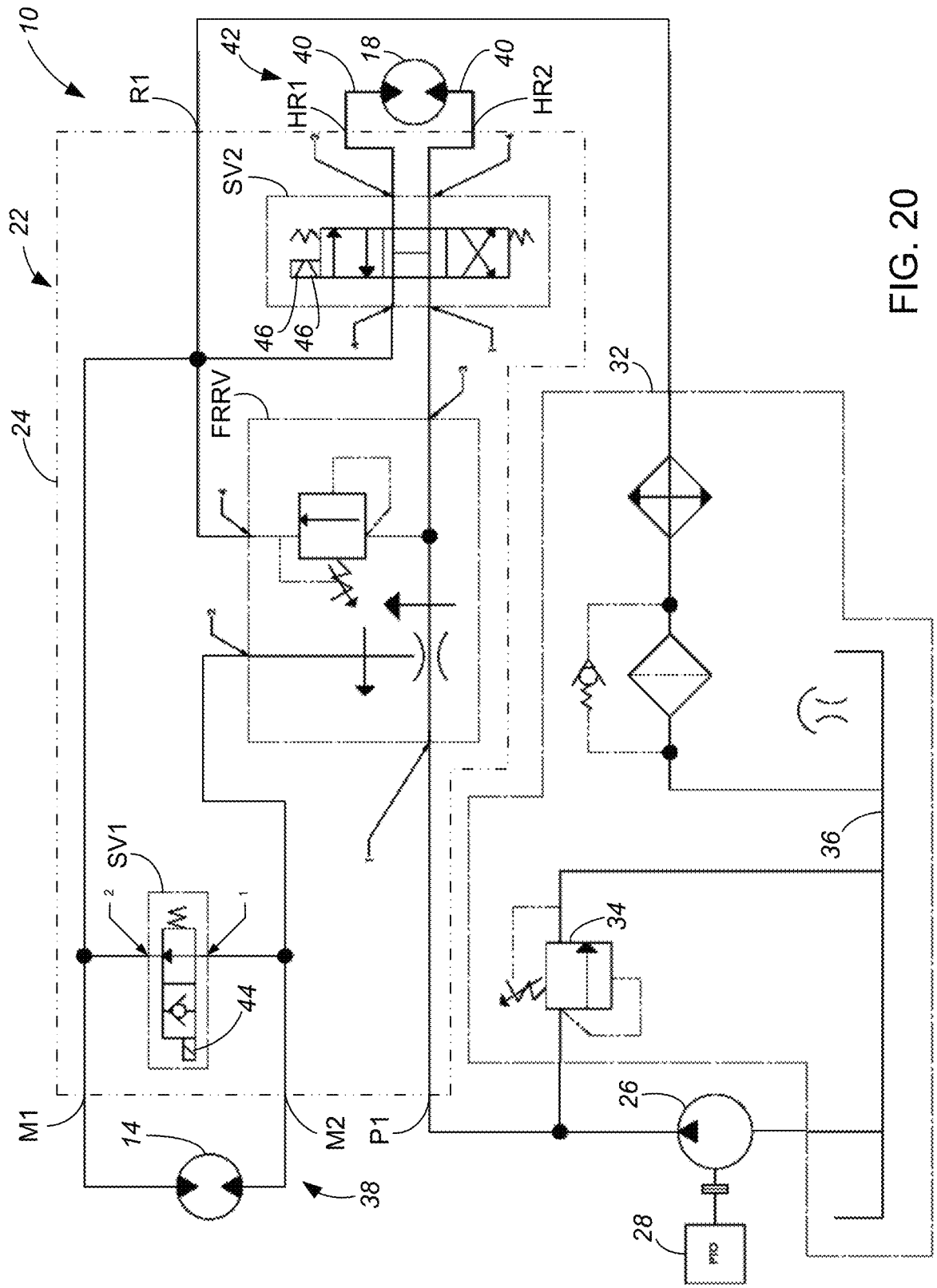
FIG. 20 is a hydraulic schematic of an alternative hydraulic system using a hydraulic manifold without the pressure relief valve. The connections for the various valves interior to the block are numbered 1-4.

The most preferred manifold block 24 also includes several openings 52 used for mounting the manifold block 24 on the vehicle 12. Alternatively, the right side surface of the manifold block 24 can be used as a mounting surface, including any holes, brackets, etc. (not shown) or other modifications as desired for mounting. FIG. 9 depicts a bobtail truck 12, with the preferred manifold 22 mounted adjacent the hose reel 20. Alternative locations for the manifold 22 are within the housing for the cooler 32, or at other locations under the truck 12 including adjacent the product pump 14.

Whereever the manifold 22 is mounted on the vehicle 12, both the solenoid valve SV1 and SV2 need to be electrically controlled, preferably on the 12 VDC electrical system of the vehicle 12. Switches (not shown) for each of the solenoid valves SV1 and SV2 are preferably mounted in appropriate locations on the vehicle 12, such as adjacent the hose reel 20, with electrical wires running from the vehicle mounted switches to the solenoids 44, 46.

The most preferred manifold block 24 includes indicia which are etched into or printed on the manifold block 24 to designate the valves and ports, i.e., "P1", "R1", "M1", "M2", "HR1", "HR2", "FRRV", "SV1", "SV2", "GM" and "GH". If desired, alternative indicia can be used or the indicia can be omitted.

FIGS. 10-14 show a first alternative embodiment of a manifold block 54 in accordance with the present invention. A primary difference between the embodiment of FIGS. 10-14 and the embodiment of FIGS. 1-5 is that the manifold block 54 in the embodiment of FIGS. 10-14 is 4.5 inches tall rather than 4 inches tall, and one of the mounting holes 52 is slightly moved. The embodiment of FIGS. 10-14 thus has additional separation room for attachment of the hose reel lines 40 at ports HR1 and HR2. A second difference between the embodiment of FIGS. 10-14 and the embodiment of FIGS. 1-5 is that the hose reel solenoid valve SV2 is larger in the embodiment of FIGS. 10-14, helping to further reduce pressure differential for easier free spooling.

FIGS. 15-19 show a second alternative embodiment of a manifold block 56 in accordance with the present invention, using an even smaller manifold block 56 at 3.5×3.5×5 inches. The smaller manifold block 56 is lighter and less costly. The layout of the valves and the ports is different, including having the high pressure port P1 and the return port R1 on the same side of the block 56, but having the two gauge ports GM and GH on different sides of the block 56. To achieve the smaller manifold size, the relief valve port RV is omitted, and the block 56 uses smaller sizes of the hose reel ports HR1 and HR2.

The system 10 is thus preferably controlled by one manifold containing all of the control valves—optionally including system relief valves as well as the directional control valves SV1 and SV2—to run the product pump 14 and to turn the hose reel 20 in both directions. The specialized control provided by the manifold is compact and contains all functions needed for operation, including readily allowing manual free-spooling of the hose reel 20. With both hydraulic and free-spool operation of the hose reel 20 and easy control of the product pump 14, product deliveries can be made more easily, quickly and safely than in the prior art. The system 10 is very safe, reliable and durable for long life.

Although the present invention has been described with reference to preferred embodiments, workers skilled in the art will recognize that changes may be made in form and detail without departing from the spirit and scope of the invention. As a particular example, all the specified pressure values and sizes detailed herein are merely exemplary of a preferred embodiment, and can be changed or adjusted for a particular use.

What is claimed is:
1. A manifold for a vehicle for delivery of fluid product pumped through a hose having a hose reel driven by a hydraulic motor, comprising:
 a block comprising:
  a high pressure input port for receiving high pressure input of hydraulic fluid from a pressurizing source on the vehicle;
  a main return port for returning hydraulic fluid to the pressurizing source;
  a product pump high pressure output port for outputting high pressure hydraulic fluid flow to a product pump hydraulic motor on the vehicle, the product pump high pressure output port being fluidly connectable through the block to the high pressure input port;
  a product pump return port for receiving hydraulic fluid flow from the product pump hydraulic motor, the product pump return port being fluidly connectable through the block to the main return port; and a first hose reel port and a second hose reel port, the first and second hose reel ports useable in a hose reel circuit for driving a hose reel hydraulic motor on the vehicle, at least one of the hose reel ports being fluidly connectable through the block to the high pressure input port, at least the other of the hose reel ports being fluidly connectable through the block to the main return port, wherein the first hose reel port and the second hose reel port are smaller than the product pump high pressure output port and the product pump return port;

a product pump control valve housed in the block, the product pump control valve having a first position wherein flow is open therethrough and a second position, the product pump control valve being fluidly connected within the block to enable hydraulic fluid flow within the block to the product pump high pressure outlet port or from the product pump return port to be on or off; and a hose reel control valve housed in the block, the hose reel control valve having a first position wherein flow is open therethrough and at least a second position, the hose reel control valve being fluidly connected within the block to enable hydraulic fluid flow within the block to or from at least one of the first and second hose reel ports to be on or off.

2. The manifold of claim 1, wherein the product pump control valve and the hose reel control valve are each solenoid-operated for control by an electric signal.

3. The manifold of claim 1, wherein the block further comprises a product pump circuit gauge port and a hose reel circuit gauge port.

4. The manifold of claim 1, wherein the block is formed of aluminum, having faces which are rectangular, and further comprising mounting holes in the block.

5. A manifold for a vehicle for delivery of fluid product pumped through a hose having a hose reel driven by a hydraulic motor, comprising:

a block comprising:
   a high pressure input port for receiving high pressure input of hydraulic fluid from a pressurizing source on the vehicle;
   a main return port for returning hydraulic fluid to the pressurizing source;
   a product pump high pressure output port for outputting high pressure hydraulic fluid flow to a product pump hydraulic motor on the vehicle, the product pump high pressure output port being fluidly connectable through the block to the high pressure input port;
   a product pump return port for receiving hydraulic fluid flow from the product pump hydraulic motor, the product pump return port being fluidly connectable through the block to the main return port; and
   a first hose reel port and a second hose reel port, the first and second hose reel ports useable in a hose reel circuit for driving a hose reel hydraulic motor on the vehicle, at least one of the hose reel ports being fluidly connectable through the block to the high pressure input port, at least the other of the hose reel ports being fluidly connectable through the block to the main return port;

a product pump control valve housed in the block, the product pump control valve having a first position wherein flow is open therethrough and a second position, the product pump control valve being fluidly connected within the block to enable hydraulic fluid flow within the block to the product pump high pressure outlet port or from the product pump return port to be on or off; and a hose reel control valve housed in the block, the hose reel control valve having a first position wherein flow is open therethrough and at least a second position, the hose reel control valve being fluidly connected within the block to enable hydraulic fluid flow within the block to or from at least one of the first and second hose reel ports to be on or off, wherein the hose reel control valve is a three position valve including a third position, wherein in the first position the first hose reel port is fluidly connected through the block to the high pressure input port and the second hose reel port is fluidly connected through the block to the main return port, and wherein in the third position the second hose reel port is fluidly connected through the block to the high pressure input port and the first hose reel port is fluidly connected through the block to the main return port, such that the hose reel can be driven for winding and driven for unwinding of the hose on its reel.

6. The manifold of claim 5, wherein in the second position the hose reel control valve allows flow to all of its valve ports.

7. A manifold for a vehicle for delivery of fluid product pumped through a hose having a hose reel driven by a hydraulic motor, comprising:

a block comprising:
   a high pressure input port for receiving high pressure input of hydraulic fluid from a pressurizing source on the vehicle;
   a main return port for returning hydraulic fluid to the pressurizing source;
   a product pump high pressure output port for outputting high pressure hydraulic fluid flow to a product pump hydraulic motor on the vehicle, the product pump high pressure output port being fluidly connectable through the block to the high pressure input port;
   a product pump return port for receiving hydraulic fluid flow from the product pump hydraulic motor, the product pump return port being fluidly connectable through the block to the main return port; and
   a first hose reel port and a second hose reel port, the first and second hose reel ports useable in a hose reel circuit for driving a hose reel hydraulic motor on the vehicle, at least one of the hose reel ports being fluidly connectable through the block to the high pressure input port, at least the other of the hose reel ports being fluidly connectable through the block to the main return port;

a product pump control valve housed in the block, the product pump control valve having a first position wherein flow is open therethrough and a second position, the product pump control valve being fluidly connected within the block to enable hydraulic fluid flow within the block to the product pump high pressure outlet port or from the product pump return port to be on or off;

a hose reel control valve housed in the block, the hose reel control valve having a first position wherein flow is open therethrough and at least a second position, the hose reel control valve being fluidly connected within the block to enable hydraulic fluid flow within the block to or from at least one of the first and second hose reel ports to be on or off; and a priority flow valve housed in the block, the priority flow valve for providing more high pressure flow through the block to product pump control valve than to the hose reel control valve.

8. The manifold of claim 7, wherein the priority flow valve includes pressure relief.

9. The manifold of claim 8, wherein the pressure relief of the priority flow valve is set to a value over 1000 psi.

10. The manifold of claim 7, wherein the first hose reel port and the second hose reel port are smaller than the product pump high pressure output port and the product pump return port.

11. The manifold of claim 10, wherein the first hose reel port and the second hose reel port are each at least ⅜ inch inner diameter connections.

12. A vehicle carried hydraulic circuit comprising:
a hydraulic product pump for delivering product through a hose;
a hose reel hydraulic motor for winding and/or unwinding the hose on a hose reel;
a high pressure source of hydraulic fluid; and
a control manifold mountable on the vehicle, the control manifold comprising:
a block comprising:
a high pressure input port fluidly connected to the high pressure source;
a main return port fluidly connected for returning hydraulic fluid to the high pressure source;
a product pump high pressure output port fluidly connected to the hydraulic product pump for outputting high pressure hydraulic fluid flow;
a product pump return port fluidly connected to the hydraulic product pump for receiving hydraulic fluid flow; and
a first hose reel port and a second hose reel port, the first and second hose reel ports being fluidly connected to the hose reel hydraulic motor;
a product pump control valve housed in the block, the product pump control valve having a first position wherein high pressure hydraulic fluid flows through the hydraulic product pump and a second position wherein high pressure hydraulic fluid does not flow through the hydraulic product pump; and
a hose reel control valve housed in the block, the hose reel control valve having a first position wherein the hose reel hydraulic motor winds and/or unwinds the hose on the hose reel and at least a second position wherein the hose reel hydraulic motor does not wind or unwind the hose on the hose reel;
wherein hydraulic lines between the first and second hose reel ports of the control manifold and the hose reel hydraulic motor have inner diameters of at least ⅜ inches, and wherein hydraulic lines from the product pump high pressure output port of the control manifold to the product pump and from the product pump to the product pump return port of the control manifold are larger than the hydraulic lines between the first and second hose reel ports of the control manifold and the hose reel hydraulic motor.

13. The vehicle carried hydraulic circuit of claim 12, wherein the high pressure source of hydraulic fluid comprises a PTO driven by a vehicle engine.

14. The vehicle carried hydraulic circuit of claim 12, wherein the block further comprises a product pump circuit gauge port, a hose reel circuit gauge port, and a main pressure relief.

15. A vehicle carried hydraulic circuit comprising:
a hydraulic product pump for delivering product through a hose;
a hose reel hydraulic motor for winding and/or unwinding the hose on a hose reel;
a high pressure source of hydraulic fluid; and
a control manifold mountable on the vehicle, the control manifold comprising:
a block comprising:
a high pressure input port fluidly connected to the high pressure source;
a main return port fluidly connected for returning hydraulic fluid to the high pressure source;
a product pump high pressure output port fluidly connected to the hydraulic product pump for outputting high pressure hydraulic fluid flow;
a product pump return port fluidly connected to the hydraulic product pump for receiving hydraulic fluid flow; and
a first hose reel port and a second hose reel port, the first and second hose reel ports being fluidly connected to the hose reel hydraulic motor;
a product pump control valve housed in the block, the product pump control valve having a first position wherein high pressure hydraulic fluid flows through the hydraulic product pump and a second position wherein high pressure hydraulic fluid does not flow through the hydraulic product pump; and
a hose reel control valve housed in the block, the hose reel control valve having a first position wherein the hose reel hydraulic motor winds and/or unwinds the hose on the hose reel and at least a second position wherein the hose reel hydraulic motor does not wind or unwind the hose on the hose reel, wherein the hose reel control valve is a three position valve including a third position, wherein in the first position the hose reel hydraulic motor winds the hose reel, wherein in the second position the hose reel hydraulic motor allows free spooling, and wherein in the third position the hose reel hydraulic motor unwinds the hose reel.

16. The vehicle carried hydraulic circuit of claim 15, wherein hydraulic lines between the first and second hose reel ports of the control manifold and the hose reel hydraulic motor have inner diameters of at least ⅜ inches, and wherein hydraulic lines from the product pump high pressure output port of the control manifold to the product pump and from the product pump to the product pump return port of the control manifold are larger than the hydraulic lines between the first and second hose reel ports of the control manifold and the hose reel hydraulic motor.

17. The vehicle carried hydraulic circuit of claim 15, wherein in the second position the hose reel control valve allows flow to all of its valve ports, thereby allowing for free spooling.

18. A vehicle carried hydraulic circuit comprising:
a hydraulic product pump for delivering product through a hose;
a hose reel hydraulic motor for winding and/or unwinding the hose on a hose reel;
a high pressure source of hydraulic fluid; and
a control manifold mountable on the vehicle, the control manifold comprising:
a block comprising:
a high pressure input port fluidly connected to the high pressure source;
a main return port fluidly connected for returning hydraulic fluid to the high pressure source;

a product pump high pressure output port fluidly connected to the hydraulic product pump for outputting high pressure hydraulic fluid flow;

a product pump return port fluidly connected to the hydraulic product pump for receiving hydraulic fluid flow; and a first hose reel port and a second hose reel port, the first and second hose reel ports being fluidly connected to the hose reel hydraulic motor;

a product pump control valve housed in the block, the product pump control valve having a first position wherein high pressure hydraulic fluid flows through the hydraulic product pump and a second position wherein high pressure hydraulic fluid does not flow through the hydraulic product pump; and a hose reel control valve housed in the block, the hose reel control valve having a first position wherein the hose reel hydraulic motor winds and/or unwinds the hose on the hose reel and at least a second position wherein the hose reel hydraulic motor does not wind or unwind the hose on the hose reel; and a priority flow valve housed in the block, the priority flow valve for providing more high pressure flow through the block to product pump control valve than to the hose reel control valve, such that when about 18 gallons per minute of hydraulic fluid is provided to the product pump, about 2 gallons per minute of hydraulic fluid is provided to the hose reel hydraulic motor.

19. The vehicle carried hydraulic circuit of claim 18, wherein the priority flow valve includes pressure relief, wherein the pressure relief of the priority flow valve is set to a value over 1000 psi.

* * * * *